3,062,758
PLASTISOL COMPOSITIONS AND METHOD OF
MAKING THEM
William C. Rainer, Barrington, R.I., Nancy B. Bump, Rehoboth, Mass., and Francis R. Dudzik, Rumford, R.I., assignors to Chemical Products Corporation, East Providence, R.I., a corporation of Rhode Island
No Drawing. Filed June 10, 1959, Ser. No. 819,248
2 Claims. (Cl. 260—2.5)

This invention relates to improved plastisol compositions. In one respect it provides a method of controlling and stabilizing the viscosity of plastisol compositions, and in another aspect provides an improved poreforming plastisol composition.

Plastisols are commonly used as molding compounds in numerous fields of manufacture. They consist of a dispersion of solid resin particle having a protective coating suspended in a plasticizer, and upon heating, the resin and plasticizer are caused to combine to form a solid gel-like structure. Many plastisol compositions, however, tend to increase in viscosity and to become unstable during storage, and often the resin particles separate and settle to the bottom of the mixture, especially where there is a high filler or low resin composition.

Still another recently developed used of plastisols is in sponge-like cellular structures. For this purpose, the plastisol mixture will contain a blowing agent capable of decomposing to form gas bubbles upon heating. Where a structure having closed cells is desired, the blowing agent must decompose in a medium of high viscosity in order to form small closed cell plastic structures. If the viscosity is too low, the cells will enlarge and break. Therefore, it is essential that the plastisols used have a controllably high viscosity at decomposition temperature of the blowing agent.

The selection of a suitable blowing agent for plastisol compositions has presented a problem in that blowing agents suitable for other plastics have not been particularly suitable for use in plastisols. Sodium bicarbonate is commonly employed in pore-forming compositions, but, in plastisols, its decomposition is erratic and it tends to form overly large and irregular pores. It has now been discovered, however, that if sodium bicarbonate is combined with calcium oxide in a plastisol having a suitable high viscosity, a porous structure having uniform small closed pores will result. This discovery makes possible the use of sodium bicarbonate, an inexpensive and highly effective blowing agent, to form a cell-containing structure from plastisol compositions. In this aspect the invention is based on the discovery that calcium oxide exerts a modifying influence on the pore formation resulting from the decomposition of sodium bicarbonate, apparently through its reaction with the water that is formed in the reaction. This invention accordingly provides a novel and useful poreforming plastisol and also a means of controlling the viscosity so that a relatively stable composition for making resilient gaskets, cushion liners for crowns, sealing rings for closures, and seaming compounds for various types of containers may be had.

The plastisols with which this invention is concerned are liquid compositions formed of plastisol grade vinyl polymers, predominantly vinyl chloride, and a plasticizer for the polymer. Plastisol grade polymers are commercially available, and consist of a high molecular weight (e.g., 45,000–80,000) vinyl chloride polymer in finely divided form containing a coating of a soap film that protects the polymer from premature combining with the plasticizer. Under the influence of heat, the plasticizer is caused to permeate the coating and combine with the polymer, whereupon a solid gel structure sets up.

The plastisols of this invention contain a portion of resin particles which have been partially combined with a portion of plasticizer before being added to the balance of the resin and plasticizer going into the final composition. These novel plastisols are useful for molding or blowing, and are also well adapted for dip molding, rotational molding, or slush molding. The stability of the plastisols allows them to be shipped and stored for long periods at ordinary room temperature without serious danger of their components separating or of their viscosity increasing appreciably. In addition, these novel plastisols are adaptable for blowing, and in particular, for use with the novel, inexpensive combination of blowing agents herein disclosed.

In general, the plastisols of this invention are prepared by taking a portion of the resin required for the final composition along with a portion of the plasticizer and heating the mixture while keeping it in continuous agitation. The heating temperatures and times vary considerably with the kind of resin and plasticizer used, but in any case, heating is continued until the viscosity of the fraction has been substantially increased. This heated fraction is then cooled to room temperature and combined with the balance of the resin and plasticizer going into the final composition.

By thus treating a fraction of resin in a plasticizer, the plastisol is rendered more stable, and the viscosity is increased and tends to remain constant even during long storage periods. By varying the amount of heating, the viscosity of the final plastisol can be varied considerably to suit its anticipated requirements. In this manner, tailor-made plastisols may be manufactured to fit the requirements of the user.

The novel plastisols of this invention can be of varied compositions. Resin usually comprises 15–65 percent by weight of the mixture depending upon the intended use of the plastisol, and the plastisol also contains a large amount of plasticizer, generally from 25–75 percent. The plastisol mixture may also contain various fillers, pigments, stabilizers, and other modifiers in order to give the mixture specific qualities.

Mixtures to be used for blowing should have a viscosity of at least about 8,000 centipoises at 25° C., as measured on a Brookfield RVF viscosimeter with a No. 5 spindle at 20 r.p.m. and certain small amounts of sodium bicarbonate and calcium oxide as blowing agents. Sodium bicarbonate should preferably comprise from about 0.1–2.0 percent of the plastisol mixture and calcium oxide should comprise from about 0.2 to about 5.0 percent, but larger amounts of either or both may be used without detrimental effect. These ratios may be varied according to the requirements of the product. Excellent results have been obtained where 0.5 percent of sodium bicarbonate and 2.5 percent of calcium oxide were used.

The viscosity of the final composition is controlled by pretreating a portion of the plastisol mixture, hereinafter called the "hot dispersion portion." The size of the portion taken may vary considerably according to the desired characteristics of the resulting plastisol, but generally at least about 4 percent of the resin content of the plastisol is pretreated. This resin is thoroughly mixed and combined with a portion of the plasticizer such that the hot dispersion fraction will contain preferably about 25–30 percent by weight resin. However, if a very hot pretreating temperature is desired in order to cut the time of pretreatment, then a lower percentage of resin may be used. Conversely, if a lower pretreating temperature is desired, a higher resin content might be more suitable.

Pretreating temperatures and times vary according to the desired viscosity. To produce satisfactory results, temperatures of at least about 50° C. are required, but the temperature is preferably as high as the gel temperature of the plastisol or higher for short periods of time. In any event, the temperature must not be sustained at a point high enough for a sufficient time to cause gelation which is caused by bringing the plastisol to the gel temperature and keeping it there for a considerable length of time. Consequently, the pretreatment temperature may be above the gel point of the plastisol for short intervals without causing gelation but must not be sustained there for long periods. High pretreatment temperatures require shorter pretreatment times, and low temperatures need more time to bring about the desired increase in the viscosity of the hot dispersion portion.

The gel temperature referred to represents the lowest temperature at which gelation occurs within a reasonable length of time. Since time and temperature are interrelated, an absolute value can hardly be given. A convenient standardized procedure, however, may be made use of to provide a standard of reference, as follows:

The plastisol composition is placed in a test tube in an oil bath arranged for viscosity measurements with a Brookfield LVT viscosimeter using a No. 4 spindle at 6 r.p.m. The spindle is rotated continuously while the bath surrounding the test tube of plastisol is heated at the rate of 2° C. per minute. The viscosity and temperature of the plastisol are measured periodically and plotted to give a viscosity-temperature curve. The gel point is taken as the temperature at which the viscosity begins to increase with increasing temperature.

The resin content of the hot dispersion portion as well as the times and the temperatures of pretreatment are determined by the required increase in the viscosity of the plastisol. The hot dispersion portion must be heated sufficiently so that after the hot dispersion portion is added to the balance of the resin and plastisol, the resulting plastisol mixture will have the desired viscosity.

During the treating step, the hot dispersion portion is first thoroughly mixed and then continuously agitated while heating it to the required temperature. After sufficient heating, the hot dispersion portion is cooled to room temperature and combined with the balance of the resin and plasticizer, as well as any pigments, stabilizers, fillers, and blowing agents as may be desired. The resulting plastisol will be stable, uniform, and well-adapted for its intended use. If desired, the hot dispersion fraction may be stored prior to being mixed with the balance of the plastisol formulation, and used many months after being made up.

The invention is described below with reference to several presently preferred embodiments which have been selected for the purpose of illustration.

In Examples 1-6 a hot dispersion fraction is first made up, as for instance illustrated in Examples 1-4, and this is then combined with the balance of the plastisol components, as illustrated in Examples 5 and 6. The polyvinyl chloride may be any of the commercial plastisol grades, which are generally designated "emulsion type" and normally contain a soap coating on the particles. Examples include Geon 121, Exon 654, Pliovic AO, QYNV, Opalon 410, to name but a few. The plasticizer in the hot dispersion fraction may be any vinyl resin plasticizer of the type commonly employed in plastisol compositions, such as di-2-ethylhexyl phthalate, which is commonly referred to as DOP.

In Examples 1-4, the following procedure is followed:

Twenty-five parts by weight of polyvinyl chloride (emulsion type) and 75 parts of DOP are mixed together at room temperature in a stir-in type mixer having a jacketed vessel which may be heated or cooled. The temperature of the mixture is raised to 80° C. over a period of about one hour and the mixture is then cooled to room temperature. Constant agitation of the mixture is maintained throughout the heating and cooling steps. The viscosity of the hot dispersion fraction may be controlled by varying the time at which the fraction is held at the elevated temperature, after being heated and before being cooled as shown by Table I.

TABLE I

| Example | Holding Time, Minutes | Total Heating Time, Hrs. | Cooling Time, Hrs. | Viscosity, cp. | |
|---|---|---|---|---|---|
|  |  |  |  | 2 r.p.m. | 20 r.p.m. |
| 1 | 1 | 1 | 0.5 | 2,000 | 1,600 |
| 2 | 30 | 1.5 | 0.5 | 5,000 | 3,600 |
| 3 | 60 | 2 | 0.5 | 6,000 | 4,400 |
| 4 | 90 | 2.5 | 0.5 | 8,000 | 5,600 |
| Control | 0 | 0 | 0 | 300 | 170 |

In Table I the holding time is the period at which the fraction is held at 80° C. following heating, and the total heating time is the period from when heating began until cooling was started. The viscosity is that measured on a Brookfield RVF viscosimeter with a No. 5 spindle at 25° C. An alternative way of controlling the viscosity is by varying the temperature to which the fraction is heated, instead of, or in addition to, varying the duration of the treatment. Thus heating to a temperature of 90°, 95°, 100° C. or even higher will result in higher viscosities.

The use of the hot dispersion in a plastol composition formulated for blowing is illustrated in Examples 5 and 6, which are set forth in Table II.

TABLE II

| Ingredients | Parts by Weight | |
|---|---|---|
|  | Example 5 | Example 6 |
| Polyvinyl chloride (emulsion type) | 29.9 | 29.9 |
| Acetyl tributyl citrate | 17.4 | 17.4 |
| Di-2-ethylhexylphthalate | 6.7 | 6.7 |
| Polyvinyl chloride-vinylidene chloride copolymer (suspension type Geon 202) | 20.0 | 20.0 |
| Lime, commercial quicklime containing 52-54% CaO, 41-43% MgO | 2.5 | 2.5 |
| Sodium bicarbonate | 0.5 | 0.5 |
| Paraffin wax | 0.4 | 0.4 |
| Pigment | 2.6 | 2.6 |
| Example 1 portion | 20 |  |
| Example 4 portion |  | 20 |

Examples 5 and 6 were formulated by combining the various ingredients, the solids being fine powders, and mixing them together. The viscosities of the final products as measured on a Brookfiield RVF viscosimeter with a No. 5 spindle, at 25° C. were:

|  | Cp. at 2 r.p.m. | Cp. at 20 r.p.m. |
|---|---|---|
| Example 5 | 22,200 | 10,500 |
| Example 6 | 38,000 | 16,000 |
| Control | 16,000 | 6,400 |

The control was a composition the same as that of Examples 5 and 6, but formulated with a portion of the control reported in Table I employed in place of the portions from Examples 1 and 4. It, accordingly, shows the result achieved when none of the resin and plasticizer are preliminarily treated as a hot dispersion.

The compositions of Examples 5 and 6 may be used to form a blown plastic by heating to a temperature of about 50–100° C. following which they are finally cured at 190° C. The preheating step may be omitted and the composition preferably cured immediately. The curing temperature may vary from 175° C.–230° C. or even higher depending on the time cycle. Temperatures in excess of 190° C. produce optimum blow characteristics and are therefore preferred. Both compositions provide a structure of relatively uniform porosity, the pores of Example 5 being somewhat larger than those of Example 6. On the other hand, the control of the same composition, when heated, resulted in a solid of uneven pore size and distribution, apparently because of its lower viscosity.

Compositions of this type are well suited for numerous uses where a porous flexible structure having closed cells is desired. They are particularly suitable for forming extrudes for jar cap gaskets of the type described in U.S. Patent No. 2,047,977. The semi-liquid plastisol composition may be extruded about the edge of the jar cover and then heated to cause gelation and blowing to form a resilient, yet tough, gasket.

In the following example a low resin, high filler plasticizer composition is described.

*Example 7*

Hot dispersion portion:
  Resin component (25%)—4 parts polyvinyl chloride-diethyl maleate copolymer, 4 parts polyvinyl chloride
  Plasticizer component (75%)—24 parts DOP
Balance of plastisol molding composition:
  Resin component—6 parts polyvinyl chloride
  Plasticizer component—26 parts DOP
  Filler component—3 parts finely ground silica, 31 parts calcium carbonate
  Lead stabilizer—1 part Tribase
  Coloring component—1 part pigment DOP referred to is di-2-ethylhexyl phthalate. Other phthalate type plasticizers may also be used such as for example diisooctyl phthalate.

The Tribase referred to is described by its manufacturer as a hydrous, tribasic lead sulfate.

The hot dispersion portion was thoroughly mixed and then heated during continuous agitation until it reached a temperature of about 80° C. This portion was held at 80° C. for 15 minutes, then cooled to room temperature. The viscosity of the hot dispersion portion after pretreatment as measured by a Brookfield RVF viscosimeter with a No. 5 spindle was 40,000–50,000 centipoises at 2 r.p.m. and 15,000–20,000 centipoises at 20 r.p.m.

The balance of resin and plasticizer combined with the fillers, stabilizer and pigment were combined and then thoroughly mixed with the hot dispersion portion. The viscosity of the resulting plastisol mixture as measured by a Severs extrusion rheometer using orifice 118320 was 15–20 grams/minute at 20 pounds' pressure and 300–400 grams/minute at 100 pounds' pressure.

The plastisol composition is one characterized by relatively low resin and high filler content. The use of the hot dispersion technique is useful in binding up the plasticizer and thereby increasing the viscosity which makes it possible to form relatively thick gaskets and thick dip coatings of the composition and also prevents separation of the solids from the liquids.

From the foregoing description, it will be seen that the invention utilizes a preliminary heating of part of the resin with part of the plasticizer to form a dispersion fraction of increased viscosity. This fraction is however, still a dispersion of discrete particles of resin which still retain their characteristics, but which have been combined with an amount of plasticizer insufficient to cause gelation or solidification of the resin. The process is, in this respect, unlike prior art processes of forming vinyl chloride polymer pastes of suspension-type resins in which a part of the resin is first dissolved in the plasticizer, by the action of heat, to increase its viscosity, and the balance is then added. In such processes the resin preliminarily combined with plasticizer is not retained in the form of discrete particles as in this invention.

Although this invention has been described with reference to specific preferred embodiments, it is contemplated that numerous modifications will occur to those skilled in the art and familiar with this disclosure. It may, for instance, be desired to incorporate ingredients other than resin and plasticizer in the hot dispersion fraction, such as waxes, paraffin, stabilizers, etc., and such may be done. Variations in the time and temperature of heating and in the proportions of ingredients may also be made within the limitations described above. Where blowing compositions are desired, calcium oxide may be used alone or in combination with other oxides, as in using commercial slaked lime which contains appreciable amounts of other materials. In this connection it has been found that in some applications the presence of MgO with the CaO reduces the tendency of the composition to stick to the mold. Strontium oxide and barium oxide may also be used since they react in a way similar to calcium oxide and may be considered the equivalent thereof. Modifications of this type may be made without departing from the scope of this invention.

Having thus described our invention, what we claim and desire to protect by Letters Patent is:

1. In the method of preparing a stable plastisol by dispersing an emulsion type plastisol grade polymer of vinyl chloride of molecular weight between 45,000 and 80,000 in finely divided form containing a coating of a soap in a plasticizer for said polymer, the improvement which comprises combining at least 4 percent of the polymer with less than half of the plasticizer to form a mixture of which about 25–30 percent by weight is polymer, agitating said mixture while heating it to at least 50° C. until its viscosity has increased to at least about 1,600 cp. as measured at 25° C. on a Brookfield RVF viscosimeter with a No. 5 spindle at 20 r.p.m., cooling said mixture to about room temperature, said heating being insufficient to induce gel formation when said mixture is cooled, and combining the mixture with the balance of polymer and plasticizer.

2. In the method of preparing a stable plastisol blowing composition by dispersing an emulsion type plastisol grade polymer of vinyl chloride of molecular weight between 45,000 and 80,000 in finely divided form containing a coating of a soap in a plasticizer for said polymer, the improvement which comprises combining at least 4 percent of the polymer with less than half of the plasticizer to form a mixture of which about 25–30 percent by weight is polymer, agitating said mixture while heating it to at least 50° C. until its viscosity has increased to at least about 1,600 cp. as measured at 25° C. on a Brookfield RVF viscosimeter with a No. 5 spindle at 20 r.p.m., cooling said mixture to about room temperature, said heating being insufficient to induce gel formation when said mixture is cooled, and combining the mixture with the balance of polymer and plasticizer together with an amount of sodium bicarbonate comprising from about 0.1–2.0 percent by weight of the final mixture, and an amount of calcium oxide comprising from about 0.2–5.0 percent by weight of the final mixture.

References Cited in the file of this patent

UNITED STATES PATENTS

| | | |
|---|---|---|
| 2,327,128 | Renfrew et al. | Aug. 17, 1943 |
| 2,917,472 | Smith | Dec. 15, 1959 |

FOREIGN PATENTS

| | | |
|---|---|---|
| 591,918 | Great Britain | Sept. 2, 1947 |

OTHER REFERENCES

Schildknecht: "Vinyl and Related Polymers," John Wiley and Sons, Inc., New York, 1952, page 395.

Bovey et al.: "Emulsion Polymerization," volume IX, Interscience Publishers, Inc., New York, 1955, pages 17–21.

Schildknecht: "Polymer Processes," Interscience Pub., New York, copyright 1956, pages 570–574.